United States Patent
Aizawa et al.

(10) Patent No.: US 12,110,665 B2
(45) Date of Patent: Oct. 8, 2024

(54) CONTROL SYSTEM AND CONTROL METHOD FOR CONTROLLING WORK MACHINE IN ACCORDANCE WITH IMAGE DATA

(71) Applicant: KOMATSU LTD., Tokyo (JP)

(72) Inventors: Masanori Aizawa, Tokyo (JP); Kenjiro Shimada, Tokyo (JP); Yuki Tsuzuki, Tokyo (JP)

(73) Assignee: KOMATSU LTD., Tokyo (JP)

( * ) Notice: Subject to any disclaimer, the term of this patent is extended or adjusted under 35 U.S.C. 154(b) by 842 days.

(21) Appl. No.: 17/056,136

(22) PCT Filed: Aug. 26, 2019

(86) PCT No.: PCT/JP2019/033244
§ 371 (c)(1),
(2) Date: Nov. 17, 2020

(87) PCT Pub. No.: WO2020/054366
PCT Pub. Date: Mar. 19, 2020

(65) Prior Publication Data
US 2021/0310219 A1  Oct. 7, 2021

(30) Foreign Application Priority Data

Sep. 10, 2018  (JP) ................. 2018-169158

(51) Int. Cl.
*E02F 9/26* (2006.01)
*E02F 3/43* (2006.01)
(Continued)

(52) U.S. Cl.
CPC .............. *E02F 9/262* (2013.01); *E02F 3/434* (2013.01); *E02F 3/437* (2013.01); *G06N 3/04* (2013.01);
(Continued)

(58) Field of Classification Search
CPC .......... E02F 9/262; E02F 3/434; E02F 3/437; G06T 7/70; G06N 3/04
See application file for complete search history.

(56) References Cited

U.S. PATENT DOCUMENTS 7,233,853 B2 * 6/2007 Hendron .............. B60T 13/662
700/83
9,167,214 B2 * 10/2015 Kriel ..................... G01S 13/867
(Continued)

FOREIGN PATENT DOCUMENTS

CN       202320088 U    7/2012
CN       103362172 A   10/2013
(Continued)

OTHER PUBLICATIONS

The Office Action for the corresponding Chinese application No. 201980026485.2, issued on Dec. 1, 2021.
(Continued)

*Primary Examiner* — Ramsey Refai
(74) *Attorney, Agent, or Firm* — Global IP Counselors, LLP

(57) ABSTRACT

A system includes a work machine, a camera, and a processor. The camera captures an image including a periphery of the work machine. A processor acquires image data indicative of a captured image captured by a camera. The processor acquires, from image data, a specific object present within the captured image and a distance from the work machine to the specific object by performing image analysis using an object detection model. The object detection model is trained an image of the specific object and the distance to the specific object. The processor controls the work machine based on the distance from the work machine to the specific object when the specific object is detected in the captured image.

16 Claims, 11 Drawing Sheets

(51) Int. Cl.
*G06N 3/04* (2023.01)
*G06T 7/70* (2017.01)

(52) U.S. Cl.
CPC ...... *G06T 7/70* (2017.01); *G06T 2207/20081* (2013.01); *G06T 2207/30196* (2013.01)

(56) References Cited

U.S. PATENT DOCUMENTS

| | | | | |
|---|---|---|---|---|
| 9,333,915 | B2* | 5/2016 | Nakanishi | E02F 9/24 |
| 9,529,347 | B2* | 12/2016 | Roach | E02F 9/264 |
| 10,086,761 | B2* | 10/2018 | Kröll | E01C 23/088 |
| 10,160,383 | B2* | 12/2018 | Onuma | G06T 7/194 |
| 2006/0274149 | A1* | 12/2006 | Yoshizawa | G01S 3/20 |
| | | | | 348/148 |
| 2007/0076526 | A1* | 4/2007 | Aikyo | G01S 15/86 |
| | | | | 367/128 |
| 2009/0110301 | A1 | 4/2009 | Schopp et al. | |
| 2012/0083982 | A1* | 4/2012 | Bonefas | G05D 1/0223 |
| | | | | 382/153 |
| 2013/0141581 | A1* | 6/2013 | Mitsuta | B60Q 1/00 |
| | | | | 348/148 |
| 2013/0261885 | A1 | 10/2013 | Hargrave, Jr. et al. | |
| 2015/0070498 | A1* | 3/2015 | Kriel | B60R 1/00 |
| | | | | 348/148 |
| 2015/0138324 | A1* | 5/2015 | Shirai | H04N 13/296 |
| | | | | 348/47 |
| 2016/0070000 | A1 | 3/2016 | Takasuka et al. | |
| 2018/0139378 | A1 | 5/2018 | Moriuchi et al. | |

FOREIGN PATENT DOCUMENTS

| | | |
|---|---|---|
| JP | 2000-192514 A | 7/2000 |
| JP | 2007-72665 A | 3/2007 |
| JP | 2008-9689 A | 1/2008 |
| JP | 2016-53904 A | 4/2016 |
| JP | 2017-142591 A | 8/2017 |
| JP | 2017-147759 A | 8/2017 |
| JP | 2017-158033 A | 9/2017 |
| JP | 2018-17115 A | 2/2018 |
| JP | 2018-77190 A | 5/2018 |
| JP | 2018-147286 A | 9/2018 |

OTHER PUBLICATIONS

The International Search Report for the corresponding international application No. PCT/JP2019/033244, issued on Nov. 26, 2019.

* cited by examiner

CONTROL SYSTEM AND CONTROL METHOD FOR CONTROLLING WORK MACHINE IN ACCORDANCE WITH IMAGE DATA

CROSS-REFERENCE TO RELATED APPLICATIONS

This application is a U.S. National stage application of International Application No. PCT/JP2019/033244, filed on Aug. 26, 2019. This U.S. National stage application claims priority under 35 U.S.C. § 119(a) to Japanese Patent Application No. 2018-169158, filed in Japan on Sep. 10, 2018, the entire contents of which are hereby incorporated herein by reference.

BACKGROUND

Field of the Invention

The present invention relates to a control system and a method for a work machine.

Background Information

A technique for performing work by a work machine with automatic control is known. For example, Japanese Patent Laid-open No. 2000-192514 indicates that an excavating position and an unloading position are previously taught to a controller of the work machine. The controller controls the work machine so as to perform the excavating at the excavating position, and causes the work machine to rotate from the excavating position to the unloading position and unload materials at the unloading position.

SUMMARY

As indicated above, the work machine operates automatically when the work by the work machine is performed with the automatic control. However, such automatic operation is preferably performed while taking into account the peripheral environment. The present invention provides a technique with which work can be performed automatically by a work machine while taking into account the peripheral environment.

A system according to a first aspect includes a work machine, a camera that captures images of the periphery of the work machine, and a processor. The processor acquires image data indicative of a captured image captured by the camera. The processor acquires, from the image data, a specific object present within the captured image and a distance from the work machine to the specific object by performing image analysis using an object detection model. The object detection model is trained using an image of the specific object and the distance to the specific object. The processor controls the work machine based on a distance obtained from the distance from the work machine to the specific object when the specific object is detected in the captured image.

A method according to a second aspect is a method executed by a processor for controlling a work machine. The method includes the following processes. A first process includes acquiring image data indicative of a captured image that captures the periphery of the work machine. A second process includes acquiring, from the image data, a specific object present within the captured image and a distance from the work machine to the specific object by performing image analysis using an object detection model. The object detection model is trained using the image of the specific object and the distance to the specific object. A third process includes controlling the work machine based on the distance from the work machine to the specific object when the specific object is detected in the captured image.

A system according to a third aspect includes a work machine, a camera that captures images of the periphery of the work machine, a display, and a processor. The processor acquires image data indicative of a captured image captured by the camera. The processor acquires, from the image data, a specific object present within the captured image and a distance from the work machine to the specific object by performing image analysis using an object detection model. The object detection model is trained using the image of a specific object and the distance to the specific object. The processor adds information indicative of the specific object and information indicative of the distance to the captured image and displays the captured image on the display.

Training data according to a fourth aspect is training data for training an object detection model, the training data including: image data indicative of an image in the vicinity of the work machine, class information of a specific object present in the image, position information of the specific object in the image, and distance information related to the specific object.

A method according to a fifth aspect is a method for manufacturing an object detection model, the method including the following processes. A first process includes acquiring training data. The training data includes image data indicative of an image in the vicinity of the work machine, class information of a specific object present in the image, position information of the specific object in the image, and distance information related to the specific object. A second process includes training a model by using the training data.

A method according to a sixth aspect is a method executed by a computer, the method including the following processes. A first process includes acquiring an image of the vicinity of a work machine. A second process includes detecting a specific object present within the captured image and a distance from the work machine to the specific object by performing image analysis using an object detection model. The object detection model is trained using the image of the specific object and the distance to the specific object.

According to the present invention, the presence of a specific object and a distance to the specific object are acquired from a captured image of a work machine by performing image analysis using a trained object detection model. Further, the work machine is controlled based on a distance parameter obtained from the distance to the specific object, whereby work can be performed automatically by the work machine while taking into account the peripheral environment.

DETAILED DESCRIPTION OF EMBODIMENT(S)

Figure 1:
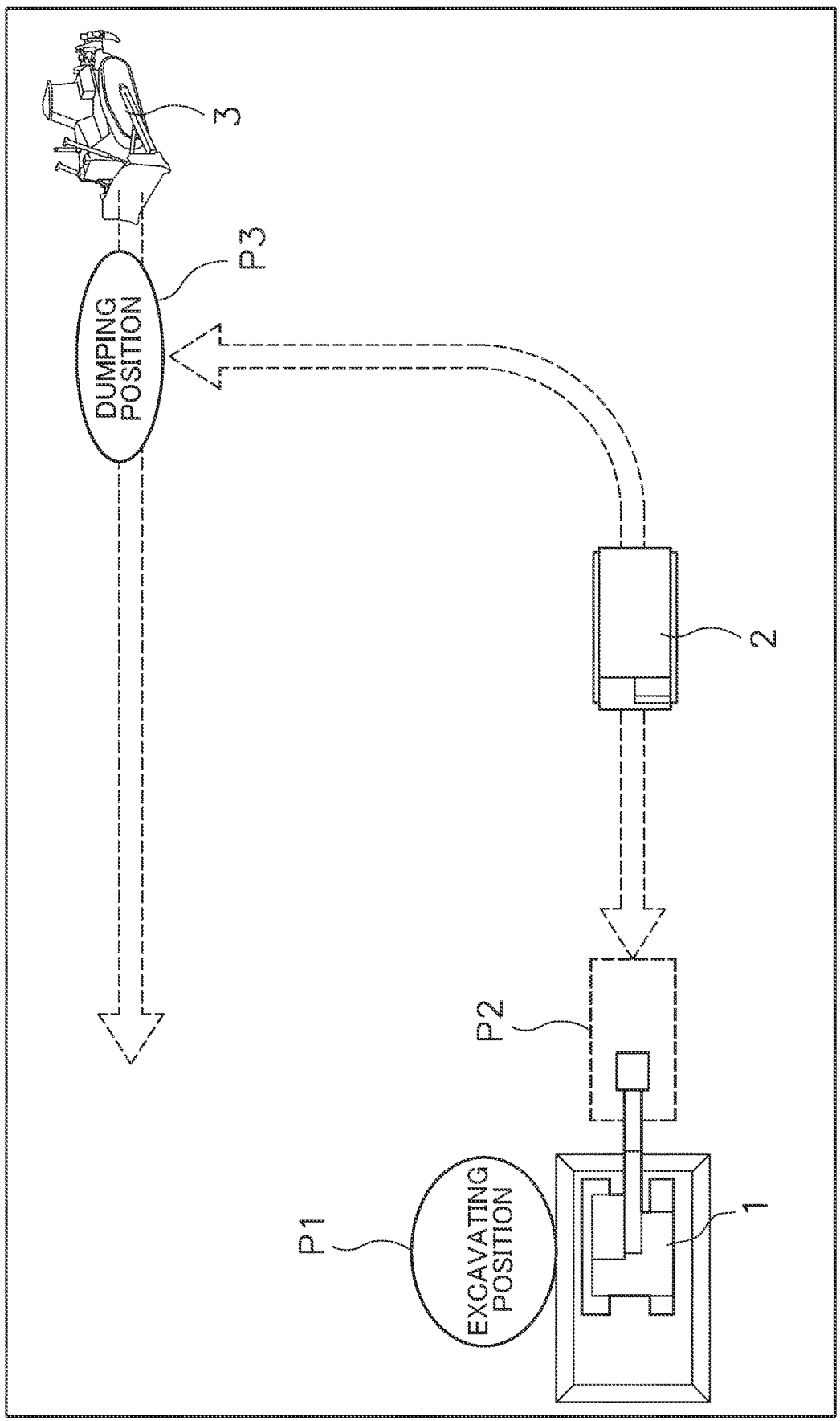
FIG. 1 is a plan view illustrating an example of a work site where a work machine is used.

A control system for a work machine 1 according to an embodiment is discussed hereinbelow with reference to the drawings. FIG. 1 is a plan view illustrating an example of a work site where the work machine 1 is used. The work machine 1 and a conveyance vehicle 2 are disposed at the work site. The work machine 1 performs work in cooperation with the conveyance vehicle 2 based on automatic control.

In the present embodiment, the work machine 1 is a hydraulic excavator. The conveyance vehicle 2 is a dump truck. The work machine 1 is disposed beside a predetermined excavating position P1 inside the work site. The conveyance vehicle 2 travels back and forth between a predetermined loading position P2 and a predetermined dumping position P3 inside the work site. The work machine 1 excavates the excavating position P1 with the automatic control and loads materials such as soil and the like onto the conveyance vehicle 2 which is stopped at the loading position P2. The conveyance vehicle 2 loaded with the materials travels to the dumping position P3 and unloads the materials at the dumping position P3. Another work machine 3 such as a bulldozer is disposed at the dumping position P3 and spreads the materials unloaded at the dumping position P3. The conveyance vehicle 2 that has unloaded the materials travels to the loading position P2 and the work machine 1 again loads the materials onto the conveyance vehicle 2 that is stopped at the loading position P2. The materials of the excavating position P1 are transported to the dumping position P3 by repeating the above work.

Figure 2:
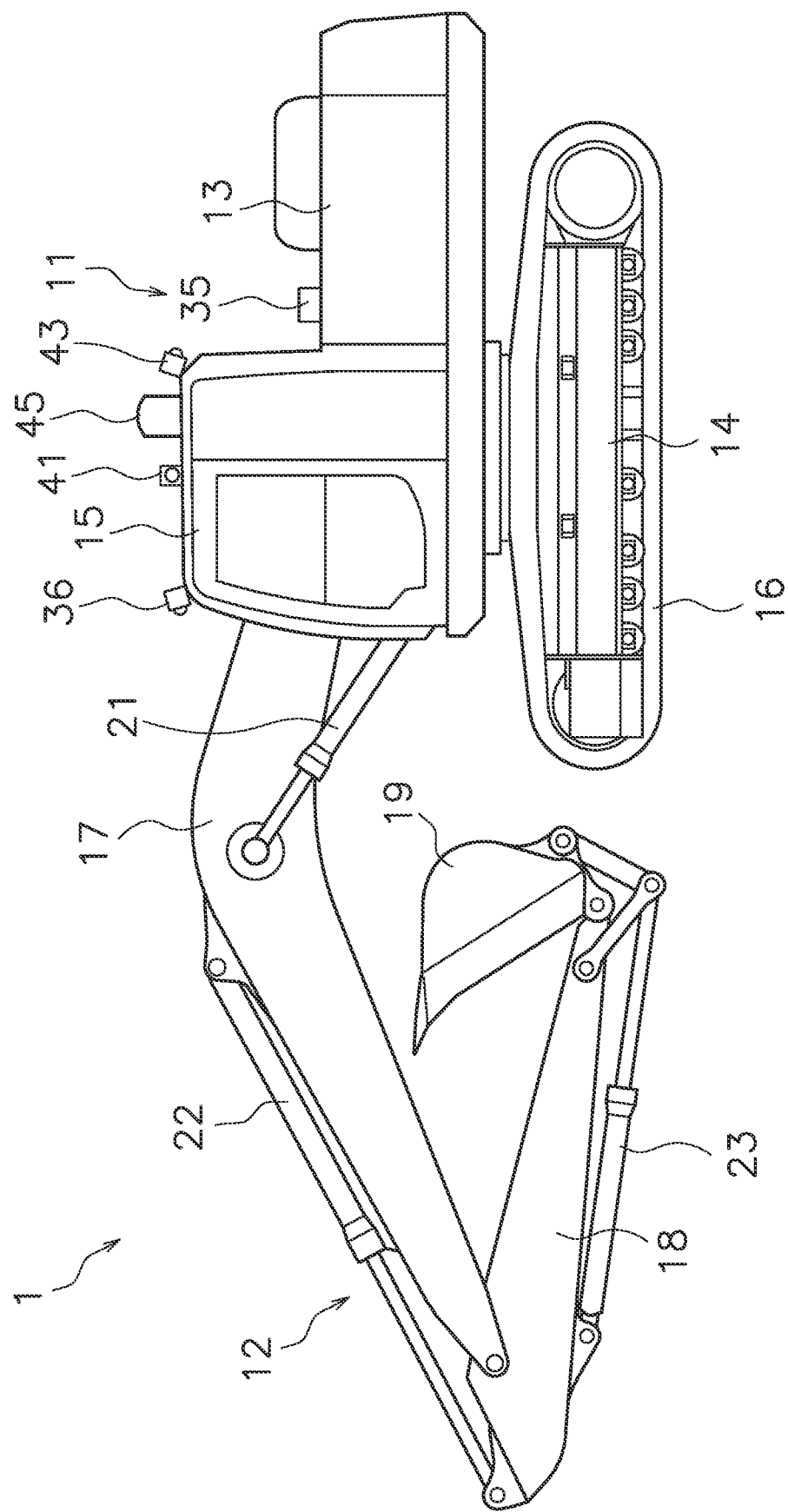
FIG. 2 is a side view of the work machine.

FIG. 2 is a side view of the work machine 1. As illustrated in FIG. 2, the work machine 1 includes a vehicle body 11 and a work implement 12. The vehicle body 11 includes a rotating body 13 and an undercarriage 14. The rotating body 13 is rotatably attached to the undercarriage 4. A cab 15 is disposed on the rotating body 13. However, the cab 15 may be omitted. The undercarriage 14 includes crawler belts 16. The crawler belts 16 are driven with driving power from a belowmentioned engine 24, whereby the work machine 1 travels.

The work implement 12 is attached to a front part of the vehicle body 11. The work implement 12 has a boom 17, an arm 18, and a bucket 19. The boom 17 is attached to the rotating body 13 so as to allow movement in the up and down direction. The arm 18 is movably attached to the boom 17. The bucket 19 is movably attached to the arm 18. The work implement 12 includes a boom cylinder 21, an arm cylinder 22, and a bucket cylinder 23. The boom cylinder 20, the arm cylinder 22, and the bucket cylinder 23 are hydraulic cylinders and are driven by hydraulic fluid from a belowmentioned hydraulic pump 25. The boom cylinder 21 actuates the boom 17. The arm cylinder 22 actuates the arm 18. The bucket cylinder 23 actuates the bucket 19.

Figure 3:
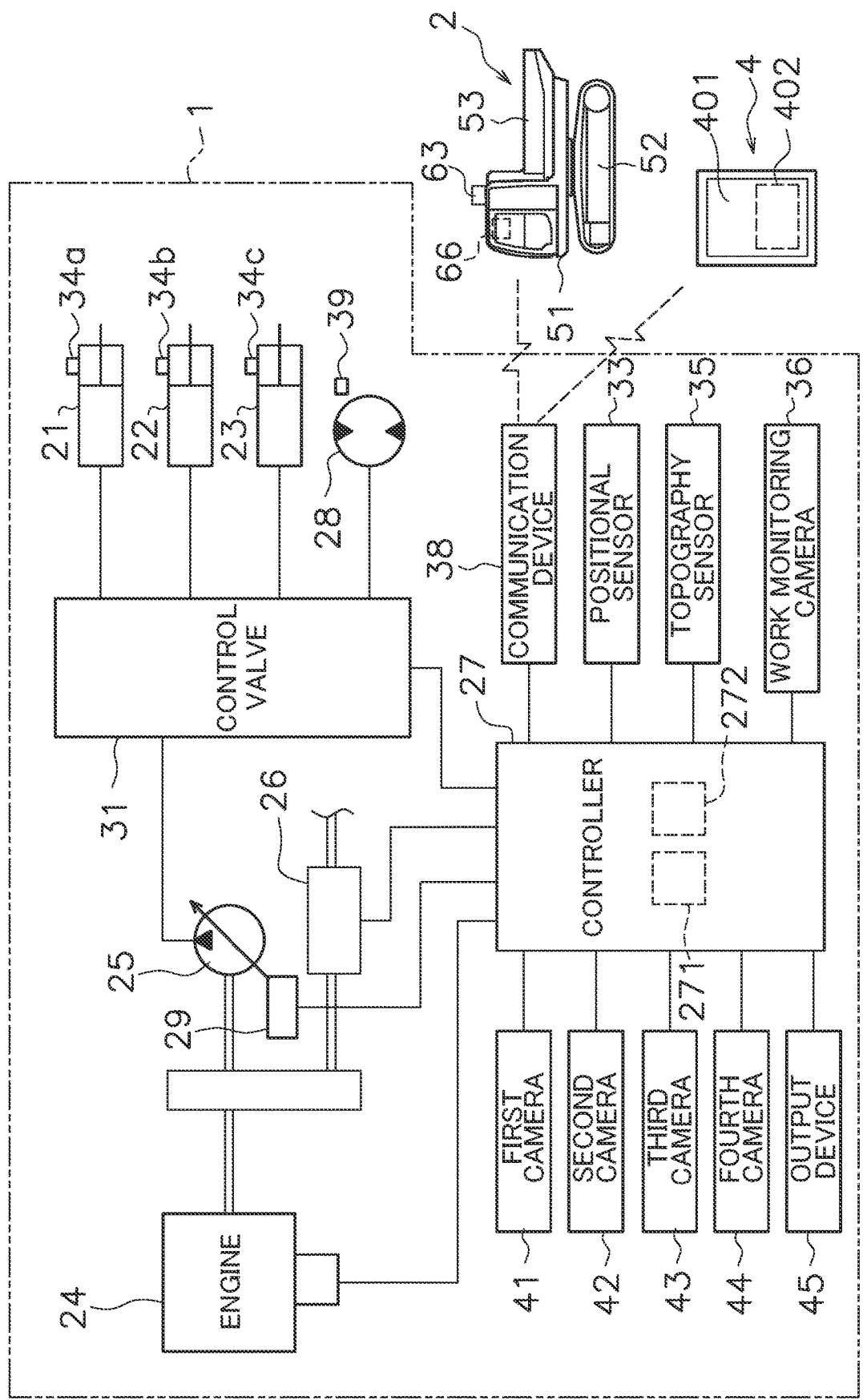
FIG. 3 is a block diagram illustrating a configuration of the work machine.

FIG. 3 is a block diagram illustrating a configuration of a control system of the work machine 1. As illustrated in FIG. 3, the work machine 1 includes the engine 24, the hydraulic pump 25, a power transmission device 26, and a controller 27.

The engine 24 is controlled by instruction signals from the controller 27. The hydraulic pump 25 is driven by the engine 24 to discharge hydraulic fluid. The hydraulic fluid discharged from the hydraulic pump 25 is supplied to the boom cylinder 21, the arm cylinder 22, and the bucket cylinder 23.

The work machine 1 includes a rotation motor 28. The rotation motor 28 is a hydraulic motor and is driven by the hydraulic fluid discharged from the hydraulic pump 25. The rotation motor 28 rotates the rotating body 13. While only one hydraulic pump 25 is illustrated in FIG. 2, a plurality of hydraulic pumps may be provided.

The hydraulic pump 25 is a variable displacement pump. A pump control device 29 is connected to the hydraulic pump 25. The pump control device 29 controls the tilt angle of the hydraulic pump 25. The pump control device 29 includes, for example, an electromagnetic valve and is controlled by instruction signals from the controller 27. The controller 27 controls the displacement of the hydraulic pump 25 by controlling the pump control device 29.

The hydraulic pump 25, the cylinders 21 to 23, and the rotation motor 28 are connected to each other by means of a hydraulic circuit via the control valve 31. The control valve 31 is controlled by instruction signals from the controller 27. The control valve 31 controls the flow rate of the hydraulic fluid supplied from the hydraulic pump 25 to the cylinders 21 to 23 and the rotation motor 28. The controller 27 controls the operation of the work implement 12 by controlling the control valve 31. The controller 27 controls the rotation of the rotating body 13 by controlling the control valve 31.

The power transmission device 26 transmits driving power from the engine 24 to the undercarriage 14. The power transmission device 26, for example, may be a transmission having a torque converter or a plurality of speed change gears. Alternatively, the power transmission device 26 may be a transmission of another type such as a hydrostatic transmission (HST) or a hydraulic mechanical transmission (HMT).

The controller 27 is programmed to control the work machine 1 based on acquired data. The controller 27 causes the work machine 1 to travel by controlling the engine 24, the undercarriage 14, and the power transmission device 26. The controller 27 causes the work implement 12 to move by controlling the engine 24, the hydraulic pump 25, and the control valve 31.

The controller 27 includes a processor 271 such as a CPU or a GPU, and a storage device 272. The processor 271 performs processing for the automatic control of the work machine 1. The memory 272 may include a volatile memory such as a RAM or the like, or a non-volatile memory such as a ROM or the like. The storage device 272 stores data and programs for the automatic control of the work machine 1.

The work machine 1 includes a positional sensor 33, work implement sensors 34*a* to 34*c*, and a rotation angle sensor 39. The positional sensor 33 detects the position of the work machine 1 and outputs position data indicative of the position of the work machine 1. The positional sensor 33 includes a global navigation satellite system (GNSS)

receiver. The GNSS receiver is, for example, a receiving apparatus for a global positioning system (GPS).

The work implement sensors 34a to 34c detect the attitude of the work implement 12 and output attitude data indicative of the attitude of the work implement 12. The work implement sensors 34a to 34c are, for example, stroke sensors that detect the stroke amounts of the cylinders 21 to 23. The attitude data of the work implement 12 includes the stroke amounts of the cylinders 21 to 23. Alternatively, the work implement sensors 34a to 34c may be other sensors such as sensors that detect the respective rotation angles of the boom 17, the arm 18, and the bucket 19. The rotation angle sensor 39 detects the rotation angle of the rotating body 13 with respect to the undercarriage 14, and outputs rotation angle data indicative of the rotation angle.

The controller 27 is communicably connected to the positional sensor 33, the work implement sensors 34a to 34c, and the rotation angle sensor 39 by wire or wirelessly. The controller 27 respectively receives the position data of the work machine 1, the attitude data of the work implement 12, and the rotation angle data from the positional sensor 33, the work implement sensors 34a to 34c, and the rotation angle sensor 39. The controller 27 calculates the blade tip position of the bucket 19 from the position data, the attitude data, and the rotation angle data. For example, the position data of the work machine 1 represents the global coordinates of the positional sensor 33. The controller 27 calculates the global coordinates of the blade tip position of the bucket 19 from the global coordinates of the positional sensor 33 based on the attitude data of the work implement 12 and the rotation angle data.

The work machine 1 includes a topography sensor 35. The topography sensor 35 measures the topography around the work machine 1 and outputs topographical data indicative of the topography measured by the topography sensor 35. In the present embodiment, the topography sensor 35 is attached to a side part of the rotating body 13. The topography sensor 35 measures the topography located to the side of the rotating body 13. The topography sensor 35 is, for example, a laser imaging detection and ranging (LIDAR) device. The LIDAR device measures the distances to a plurality of measurement points on the topography by irradiating a laser beam and measuring the reflected light thereof. The topographical data represents the positions of the measurement points with respect to the work machine 1.

The work machine 1 includes a work monitoring camera 36 and a plurality of periphery monitoring cameras 41 to 44. As illustrated in FIG. 2, the work monitoring camera 36 faces forward from the rotating body 13 and is attached to the rotating body 13. The work monitoring camera 36 capture the front of the rotating body 13. The work monitoring camera 36 is a stereo camera. The work monitoring camera 36 outputs work image data indicative of images captured by the work monitoring camera 36.

Figure 4:
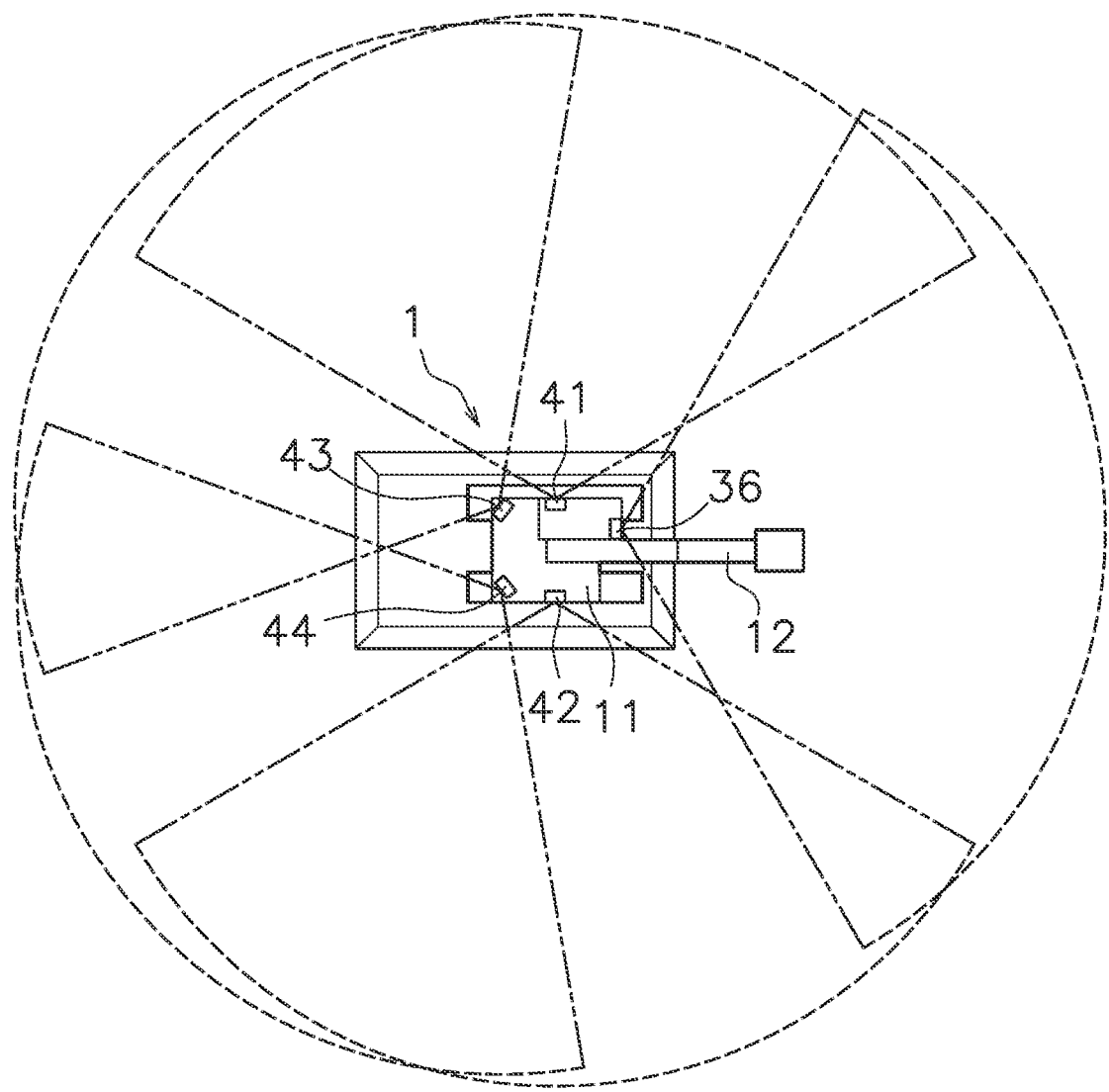
FIG. 4 is a plan view of the work machine and the periphery thereof.

The plurality of periphery monitoring cameras 41 to 44 capture the periphery of the work machine 1. The periphery monitoring cameras 41 to 44 are attached to the rotating body 13. FIG. 4 is a plan view of the work machine 1 and the periphery thereof. As illustrated in FIG. 4, the periphery monitoring cameras 41 to 44 capture images in different directions. The periphery monitoring cameras 41 to 44 are single lens cameras. The periphery monitoring cameras 41 to 44 include a first camera 41, a second camera 42, a third camera 43, and a fourth camera 44.

The first camera 41 is attached to one side part of the rotating body 13. The second camera 42 is attached to the other side part of the rotating body 13. The first camera 41 captures images to one side of the work machine 1. The second camera 42 captures images on the other side of the work machine 1. The third camera 43 and the fourth camera 44 are attached to a rear part of the rotating body 13. The third camera 43 and the fourth camera 44 capture the rear of the work machine 1.

The first camera 41 outputs first image data indicative of first captured images captured by the first camera 41. The second camera 42 outputs second image data indicative of second captured images captured by the second camera 42. The third camera 43 outputs third image data indicative of third captured images captured by the third camera 43. The fourth camera 44 outputs fourth image data indicative of fourth captured images captured by the fourth camera 44.

The controller 27 is communicably connected to the work monitoring camera 36 and the periphery monitoring cameras 41 to 44 by wire or wirelessly. The controller 27 receives the work image data from the work monitoring camera 36. The controller 27 receives the first to fourth image data from the respective periphery monitoring cameras 41 to 44. The number of the periphery monitoring cameras 41 to 44 is not limited to four and may be three or less or five or more.

The work machine 1 includes a communication device 38. The communication device 38 performs data communication with an apparatus outside of the work machine 1. The communication device 38 performs data communication with a remote computer apparatus 4 outside of the work machine 1. The remote computer apparatus 4 may be disposed at the work site. Alternatively, the remote computer apparatus 4 may be disposed at a management center removed from the work site. The remote computer apparatus 4 includes a display 401 and an input device 402.

The display 401 displays images related to the work machine 1. The display 401 displays images corresponding to signals received from the controller 27 via the communication device 38. The input device 402 is operated by an operator. The input device 402 may include, for example, a touch screen or may include hardware keys. The remote computer apparatus 4 transmits signals indicative of instructions received through the input device 402, to the controller 27 via the communication device 38.

As illustrated in FIG. 3, the conveyance vehicle 2 includes a vehicle body 51, an undercarriage 52, and a cargo bed 53. The vehicle body 51 is supported by the undercarriage 52. The undercarriage 52 is driven whereby the conveyance vehicle 2 travels. The cargo bed 53 is supported by the vehicle body 51. The conveyance vehicle 2 includes a positional sensor 63 and a communication device 66. The positional sensor 63 includes, for example, a GNSS receiver in the same way as the positional sensor 33 of the work machine 1. The positional sensor 63 detects the position of the conveyance vehicle 2. The communication device 38 performs data communication with the communication device 66 of the conveyance vehicle 2. The controller 27 of the work machine 1 receives the position data of the conveyance vehicle 2 through the communication devices 38 and 66.

Figure 5:
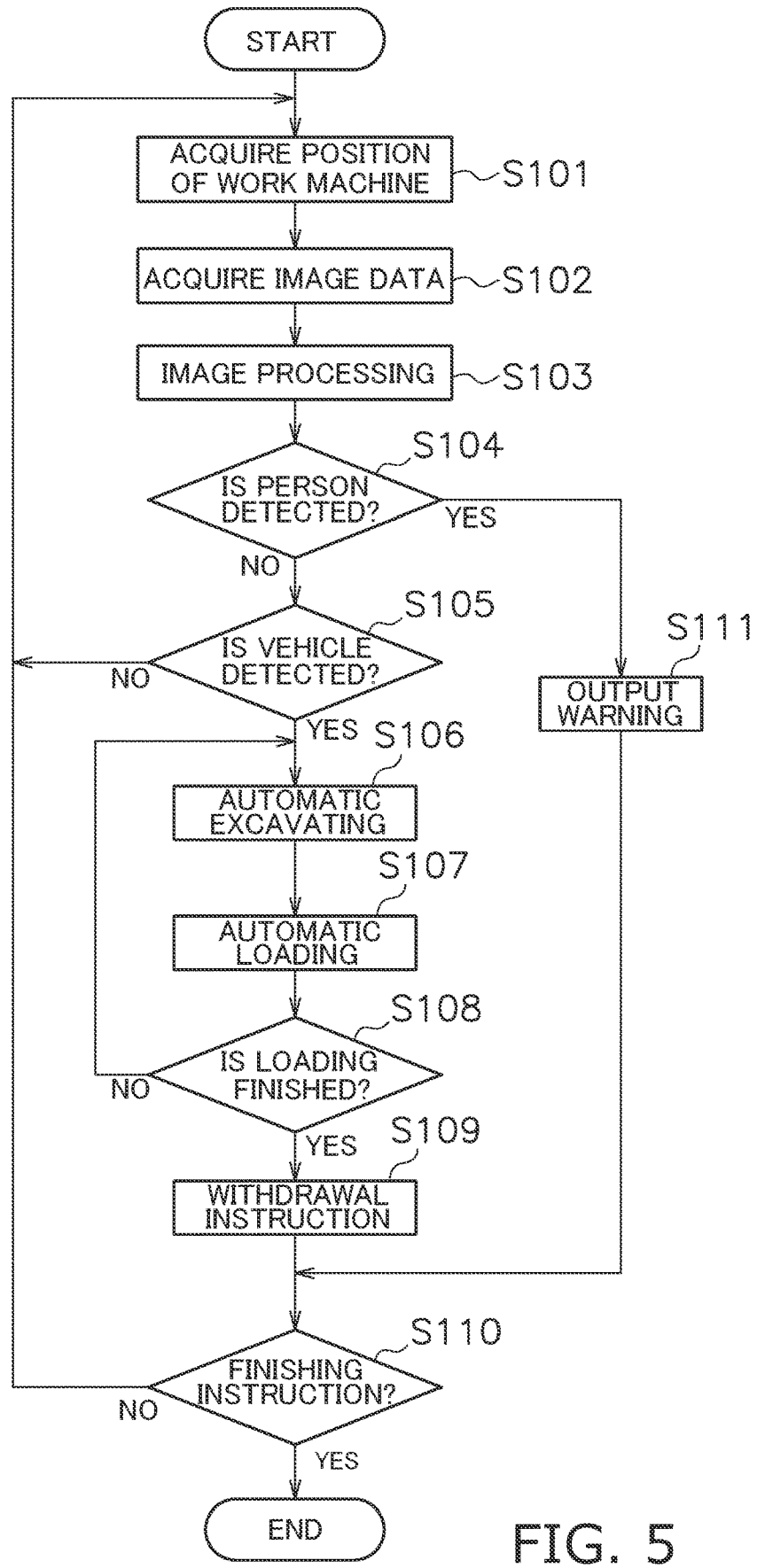
FIG. 5 is a flow chart illustrating processing in an automatic control mode.

Next, the processing of the automatic control mode executed by the controller 27 of the work machine 1 will be explained. In the automatic control mode, the controller 27 controls the work machine 1 so that the work machine 1 performs predetermined work automatically. In the present embodiment, the predetermined work is excavating and loading. FIG. 5 is a flow chart illustrating processes in an automatic control mode.

The controller 27 starts the engine 24 of the work machine 1 and executes the processes illustrated in FIG. 5 when the controller 27 receives a starting instruction for the automatic control mode. The starting instruction for the automatic control mode is outputted from the remote computer apparatus 4 by means of, for example, an operator operating the input device 402 of the abovementioned remote computer apparatus 4. The controller 27 receives the starting instruction through the communication device 38.

In step S101 as illustrated in FIG. 5, the controller 27 acquires the position of the work machine 1. The controller 27 respectively acquires the position data of the work machine 1, the attitude data of the work implement 12, and the rotation angle data from the positional sensor 33, the work implement sensors 34*a* to 34*c*, and the rotation angle sensor 39. The controller 27 calculates the blade tip position of the bucket 19 from the position data, the attitude data, and the rotation angle data.

In step S102, the controller 27 acquires the image data. The controller 27 acquires, from the work monitoring camera 36, work image data indicative of images in front of the rotating body 13. The controller 27 also acquires, from the periphery monitoring cameras 41 to 44, first to fourth image data which represent images to the both sides and to the rear of the rotating body 13. The work monitoring camera 36 and the periphery monitoring cameras 41 to 44 constantly capture images to generate the work image data and the first to fourth image data at least during the execution of the automatic control mode. The controller 27 acquires the work image data and the first to fourth image data in real time from the work monitoring camera 36 and the periphery monitoring cameras 41 to 44 at least during the execution of the automatic control mode.

In step S103, the controller 27 executes image processing. The image processing involves detecting the presence of an object in the periphery of the work machine 1 with image recognition technology based on the work image data and the first to fourth image data. In step S104, the controller 27 determines whether a person has been detected in the vicinity of the work machine 1. The image processing and the method for detecting a person are explained below. When a person is not detected in the vicinity of the work machine 1, the controller 27 executes a first control mode which is indicated in step S105 to step S109.

In step S105, the controller 27 determines whether the conveyance vehicle 2 has been detected. The controller 27 detects whether the conveyance vehicle 2 has reached a predetermined loading position P2 from the work image data using image recognition technology. Alternatively, the controller 27 detects whether the conveyance vehicle 2 has reached the predetermined loading position P2 using position data received from the conveyance vehicle 2. When the controller 27 has detected the conveyance vehicle 2, the processing advances to step S106.

In step S106, the controller 27 executes automatic excavating. The controller 27 controls the work machine 1 so as to excavate with the work implement 12 at the predetermined excavating position P1. In the automatic excavating, the controller 27 measures the topography of the excavating position P1 with the topography sensor 35. The controller 27 adjusts the excavating position of the work implement 12 in accordance with the topography of the excavating position P1 measured by the topography sensor 35. The controller 27 also determines a target excavation path in accordance with the topography of the excavating position P1 measured by the topography sensor 35. The controller 27 controls the work implement 12 so that the blade tip of the work implement 12 moves along the target excavation path.

In step S107, the controller 27 executes automatic loading. The controller 27 controls the work machine 1 so that the rotating body 13 is rotated from the excavating position P1 toward the loading position P2 and materials are unloaded from the work implement 12 at the loading position P2. Consequently, the excavated materials are loaded onto the cargo bed 53 of the conveyance vehicle 2 stopped at the loading position P2.

In step S108, the controller 27 determines whether the loading is finished. The controller 27, for example, acquires the weight of the materials loaded onto the cargo bed 53 and then determines that the loading is finished when the weight of the materials has reached a permitted weight.

In step S108, if the controller 27 has determined that the loading has not been finished, the processing returns to step S106. The processing from step S106 to step S107 is then repeated. Consequently, the material excavation and the loading of the materials onto the conveyance vehicle 2 are repeated.

If the controller 31 has determined that the loading has finished in step S108, the processing advances to step S109. In step S109, the controller 27 transmits, to the conveyance vehicle 2, a withdrawal instruction to withdraw from the loading position P2. Upon receiving the withdrawal instruction, the conveyance vehicle 2 moves from the loading position P2 toward the dumping position P3.

In step S110, the controller 27 determines whether a finishing instruction has been received. When the controller 27 has received the finishing instruction, the controller 27 stops the automatic control mode. For example, the finishing instruction is outputted from the remote computer apparatus 4 by means of, for example, an operator operating the input device 402 of the abovementioned remote computer apparatus 4. The controller 27 receives the finishing instruction through the communication device 38.

When a person is detected in the vicinity of the work machine 1 in step S104, the controller 27 executes the processing of a second control mode which is indicated in step S111. Specifically, in step S111, the controller 27 causes an output device 45 to output a warning. As illustrated in FIG. 2, the output device 45 in the present embodiment is a warning lamp provided to the work machine 1. The controller 27 turns on the warning lamp when a person is detected in the vicinity of the work machine 1. The output device 45 may also be a speaker. The controller 27 issues a warning sound from the speaker when a person is detected in the vicinity of the work machine 1.

The controller 27 performs the determination for detecting a person in the vicinity of the work machine 1 in real time during at least the execution of the automatic control mode. Therefore, the controller 27 may cause the output device 45 to output the warning while executing the processing in the first control mode when a person is detected in the vicinity of the work machine 1 during the execution of the first control mode. Alternatively, the controller 27 may stop the processing of the first control mode and cause the output device 45 to output the warning.

Next, the method for detecting a person in the vicinity of the work machine 1 will be explained. The controller 27 detects the presence of a specific object in the images which are represented by the work image data and the first to fourth image data by using image recognition technology that uses artificial intelligence (AI). The specific object includes a person. The specific object is not limited to a person and may include the conveyance vehicle 2 or another work machine such as a bulldozer. The controller 27 identifies a person or another specific object using the image recognition technology.

Figure 6:
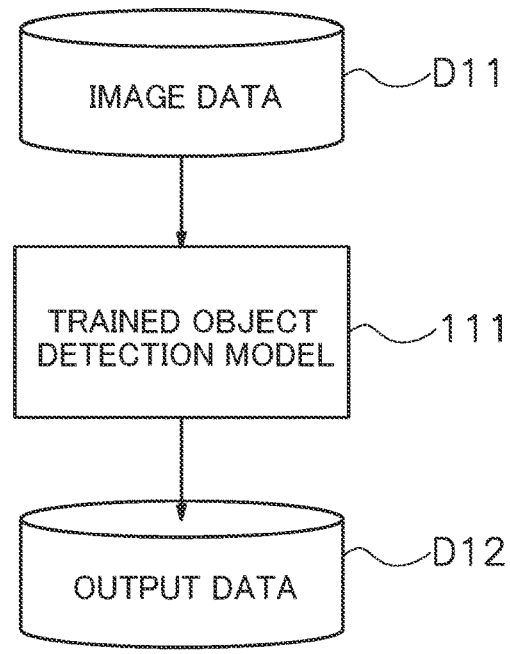
FIG. 6 is a schematic view illustrating a configuration for performing image analysis using an object detection model.

As illustrated in FIG. 6, the controller 27 includes a trained object detection model 111. The object detection model 111 is implemented in the controller 27. The object detection model 111 is an artificial intelligence model for image analysis. The object detection model 111 analyzes inputted image data D11 and determines whether a specific object is included in the images represented by the image data. The image data D11 includes the abovementioned work image data and the first to fourth image data.

When a specific object is included in an image represented by the image data D11, the object detection model 111 outputs the class of the specific object in the image, the coordinates of the specific object in the image, and the distance to the specific object. The class of the specific object is the type of specific object and includes a person. The class of the specific object may include types other than a person such as the conveyance vehicle 2 or a bulldozer or the like.

Figure 7:
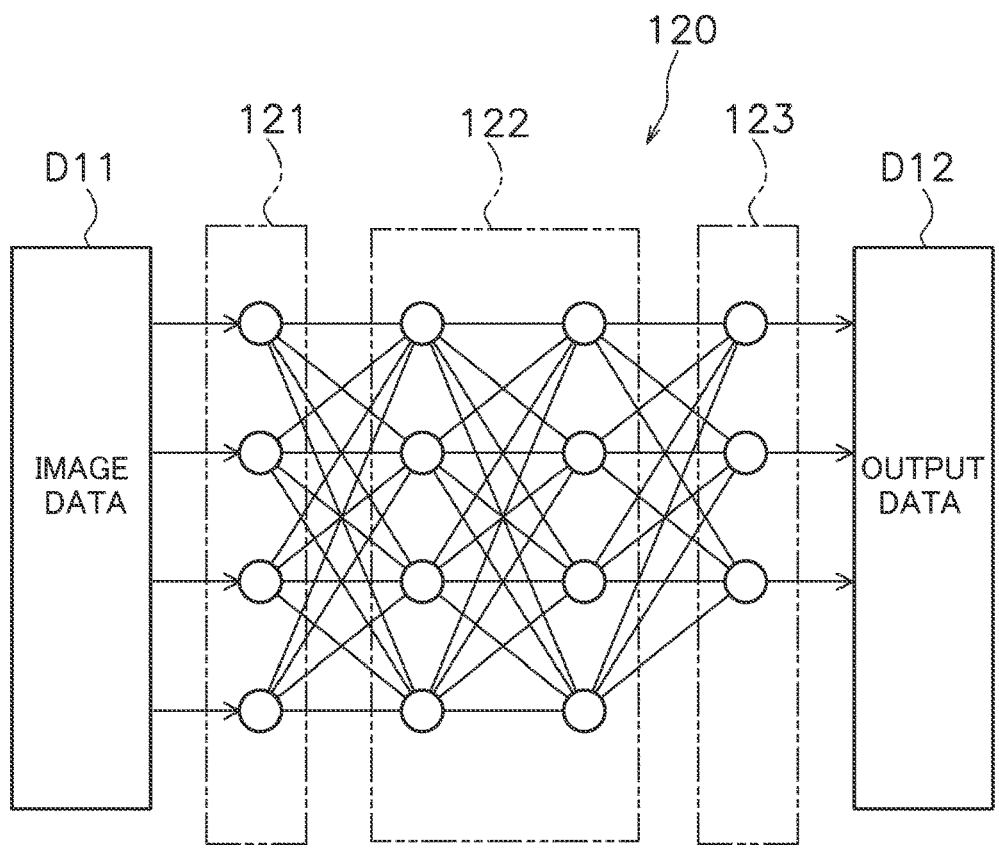
FIG. 7 is a schematic view illustrating a configuration of the object detection model.

The object detection model 111 includes a neural network 120 illustrated in FIG. 7. For example, the object detection model 111 includes a deep neural network such as a convolutional neural network (CNN). As illustrated in FIG. 7, the neural network 120 includes an input layer 121, an intermediate layer 122 (hidden layer), and an output layer 123. The layers 121, 122, and 123 include one or more neurons. The neurons of adjacent layers are coupled together and weights (coupled loads) are set for each coupling. The number of neuron couplings may be set as appropriate. Thresholds are set for each neuron and an output value outputted by each neuron is determined according to whether the sum of the products of the input values to each neuron and the weights exceed the threshold.

The image data D11 is inputted to the input layer 121. Output values which indicate the class of the specific object detected in the image, the coordinates of the specific object in the image, and the distance to the specific object are outputted by the output layer 123. The object detection model 111 is trained so as to output the output values which indicate the class of the specific object detected in the image, the coordinates of the specific object in the image, and the distance to the specific object when the image data D11 is inputted. Trained parameters of the object detection model 111 obtained through the training are stored in the controller 27. The trained parameters include, for example, the number of layers of the neural network 120, the number of neurons in each layer, the coupling relationships among the neurons, the weights of the couplings among neurons, and thresholds of each neuron.

Figure 8:
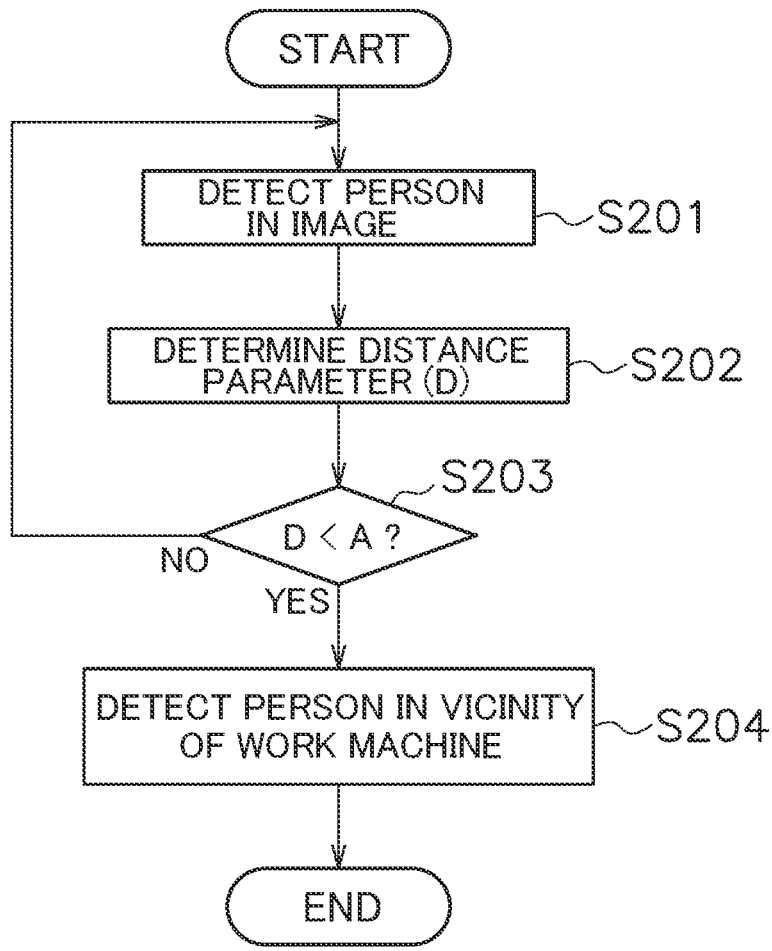
FIG. 8 is a flow chart illustrating processing for detecting a person in the vicinity of the work machine.

FIG. 8 is a flow chart illustrating processing for detecting a person in the vicinity of the work machine 1. As illustrated in step S201 in FIG. 8, the controller 27 detects a person in an image. The controller 27 detects a person in each of an image represented by the work image data and a plurality of captured images of the work machine 1 represented by the first to fourth image data, by using image analysis that uses the object detection model 111 as indicated above.

Figure 9:
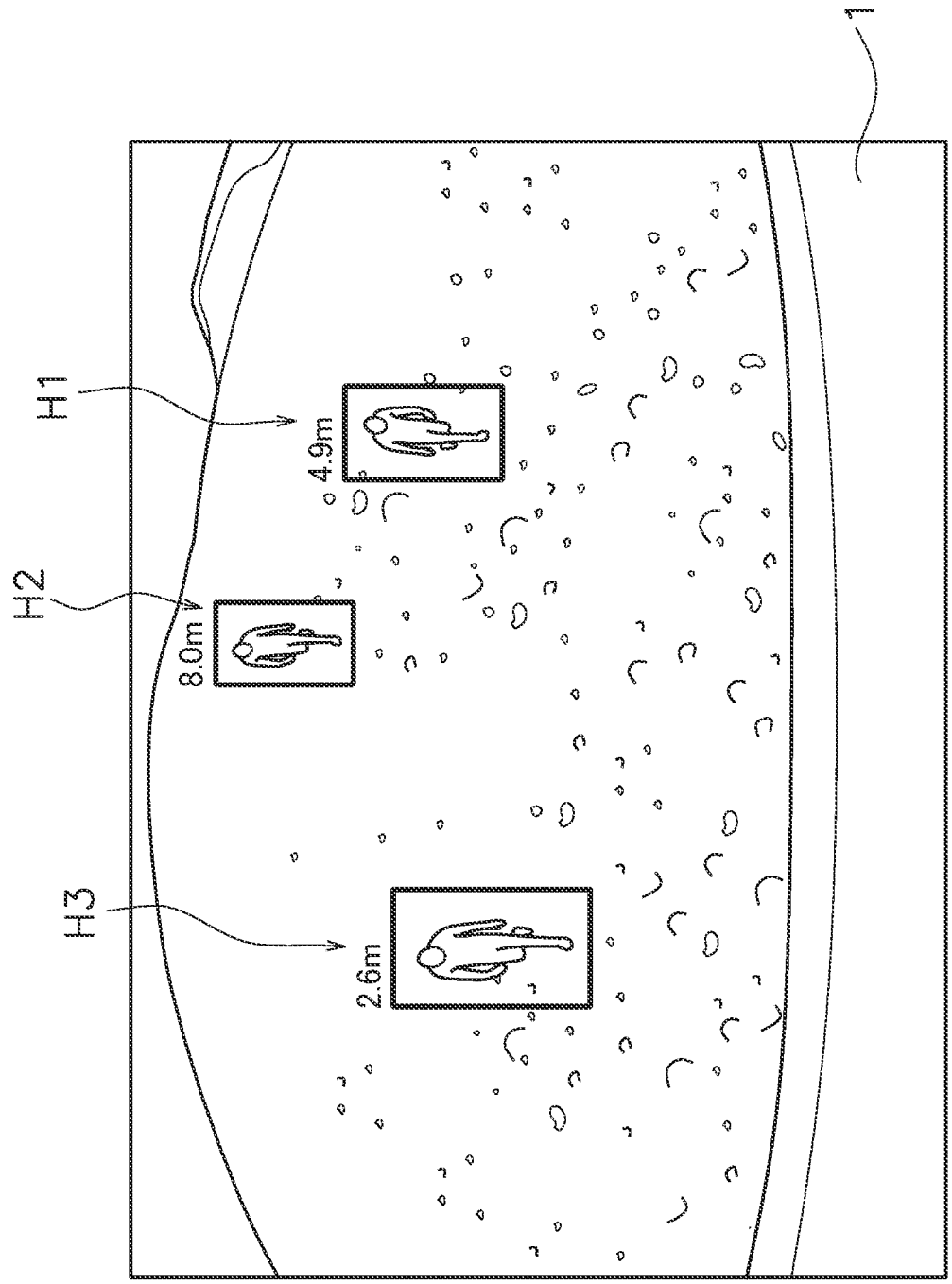
FIG. 9 illustrates an example of a captured image of the work machine.
Figure 10:
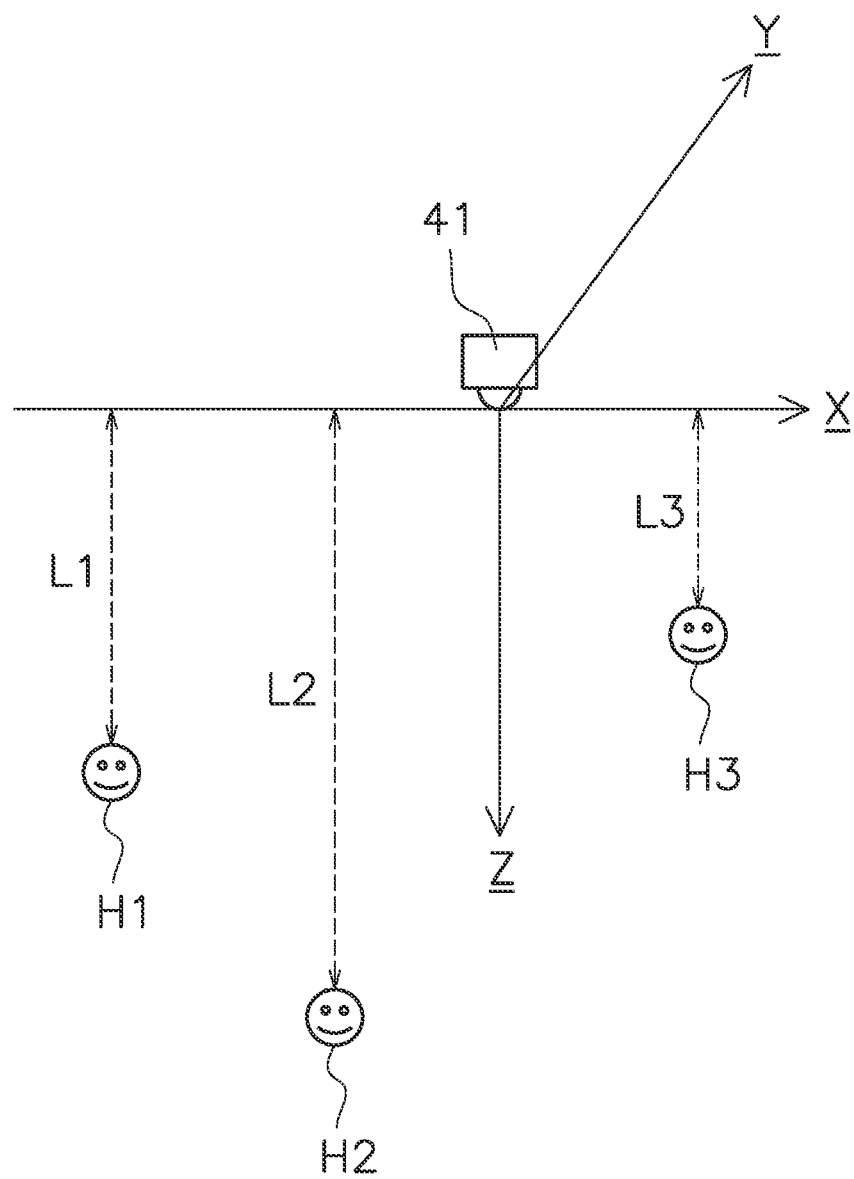
FIG. 10 is a plan view illustrating the position of persons detected in the captured image illustrated in FIG. 9.

FIG. 9 illustrates an example of a first captured image captured by the first camera 41. As illustrated in FIG. 9, the controller 27 recognizes and detects a plurality of persons H1 to H3 in the image when the plurality of persons H1 to H3 are included in the image. The controller 27 detects the coordinates in the image and the distances to the work machine 1 of each of the plurality of persons H1 to H3 in the image. The coordinates of the persons H1 to H3 in the image indicate the positions within the image of a frame that indicates the persons H1 to H3. For example, FIG. 10 is a plan view illustrating the positions of the persons H1 to H3 detected in the image illustrated in FIG. 9. The controller 27 acquires respective distances L1 to L3 from the work machine 1 to the persons H1 to H3 included in the image.

In step S202, the controller 27 determines a distance parameter D. When only one person is included in the image, the controller 27 determines the distance to said person included in the image as the distance parameter D. When a plurality of persons are included in the image, the controller 27 selects the shortest distance among the distances to the plurality of persons included in the image as the distance parameter D.

In the example illustrated in FIG. 10, the controller 27 selects the shortest distance L3 among the respective distances L1 to L3 to the plurality of persons H1 to H3 included in the image, as the distance parameter D3. The controller 27 detects a person included in each image for each predetermined sampling time period, and acquires the distance to said person. In addition, the controller 27 determines the distance parameter D for each predetermined sampling time period.

The controller 27 determines the distance parameter D for each of the first to fourth captured images. For example, when a plurality of persons are detected in the first captured image, the controller 27 determines the shortest distance to the plurality of persons included in the first captured image as the distance parameter D of the first captured image. When a plurality of persons are detected in the second captured image, the controller 27 determines the shortest distance to the plurality of persons included in the second captured image as the distance parameter D of the second captured image. When a plurality of persons are detected in the third captured image, the controller 27 determines the shortest distance to the plurality of persons included in the third captured image as the distance parameter D of the third captured image. When a plurality of persons are detected in the fourth captured image, the controller 27 determines the shortest distance to the plurality of persons included in the fourth captured image as the distance parameter D of the fourth captured image.

In step S203, the controller 27 determines whether the distance parameter D is less than a predetermined distance threshold A. When the distance parameter D is less than the predetermined distance threshold A, the controller 27 determines, in step S204, that a person is detected in the vicinity of the work machine 1.

When a person is detected in a plurality of captured images, the controller 27 determines, in step S203, whether at least one of the respective distance parameters D of the plurality of captured images is less than the predetermined distance threshold A. When at least one of the distance parameters D in each of the plurality of captured images is less than the predetermined distance threshold A, the controller 27 determines, in step S204, that a person is detected in the vicinity of the work machine 1.

As indicated above, the controller 27 outputs a warning from the output device 45 when a person is detected in the vicinity of the work machine 1. Therefore, the controller 27 outputs the warning from the output device 45 when a person is detected in a range from the work machine 1 to a predetermined distance threshold A in at least one of the plurality of captured images. The controller 27 also stops the warning from the output device 45 when a person is no longer detected in the range from the work machine 1 to the predetermined distance threshold A in the image represented by the work image data and all of the captured images.

In the control system of the work machine 1 according to the present embodiment explained above, the controller 27 detects the presence of a person and acquires the distance from the work machine 1 to the person from the captured images of the work machine 1 by image analysis using the trained object detection model 111. Further, the controller 27 controls the work machine 1 based on the distance to the detected person, whereby work can be performed automatically by the work machine while taking into account the peripheral environment.

In addition, the object detection model 111 learns the specific object and the distance to the object and, therefore, if a single image is inputted to the object detection model 111, the specific object included in the single image and the distance can be obtained. As a result, the distance can be acquired from the single image without using shape information of the captured topography or information such as the size of the object.

Figure 11:
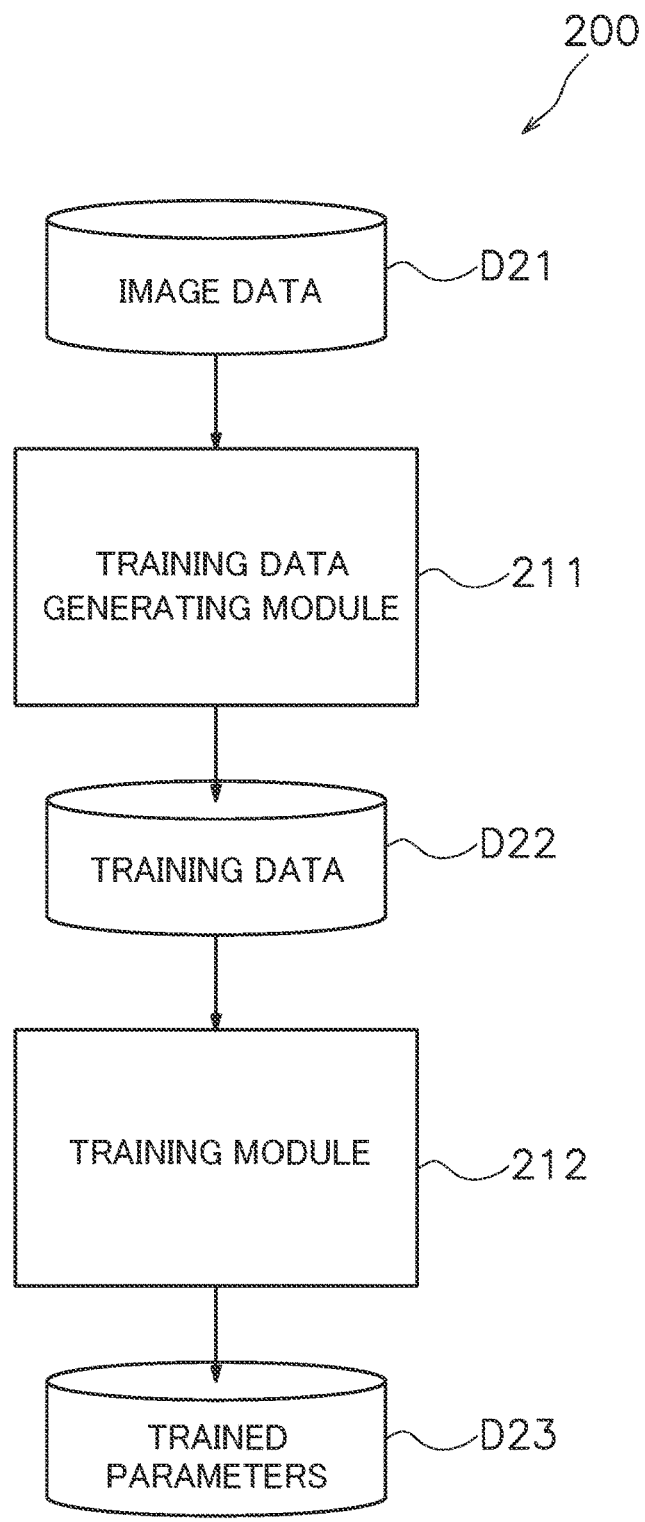
FIG. 11 is a schematic view illustrating a configuration of a training system for training the object detection model.

A training method of the classification model 111 according to an embodiment will be explained next. FIG. 11 illustrates a training system 200 for training the object detection model 111. The training system 200 includes a training data generating module 211 and a training module 212.

The training data generating module 211 generates training data D22 from image data D21. The training module 212 uses the training data D22 to train the object detection model 111 and to optimize the parameters of the object detection model 111. The training system 200 acquires the optimized parameters as trained parameters D23. The training data generating module 211 and the training module 212 are implemented in a computer. The training data generating module 211 and the training module 212 may be implemented in a single computer. Alternatively, the training data generating module 211 and the training module 212 may be distributed and implemented in a plurality of computers.

The training data generating module 211 assigns the class information, the position information, and the distance information of the specific object to an image within a frame designated in the images represented by the image data D21. The class information indicates the class of the specific object present in the image. The position information is the position of the specific object in the image and indicates the coordinates of the frame in the image. The distance information indicates the distance to the specific object.

The class information may be assigned by manual input by a human. The position information may be assigned by computation of the training data generating module 211 from the image data D21. The distance information may be assigned by computation of the training data generating module 211 from the image data D21 acquired with a stereo camera. Alternatively, the distance information may be assigned by manual input by a human. The training data generating module 211 repeats the above assigning on a plurality of images and thereby generates the training data D22.

The training module 212 trains the object detection model 111 using the training data D22. The training module 212 uses an image included in the training data D22 as input data and uses the class of the specific object in the work image, the coordinates of the specific object in the image, and the distance to the specific object as training data to train the object detection model 111.

For example, a computer 202 performs a computation process of the forward propagation direction of the neural network 120 by using pixel values of the images as inputs to the input layer 121. As a result, the training module 212 obtains output values outputted from the output layer 123 of the neural network 120. Next, the training module 212 calculates errors between the output values outputted by the output layer 123 and correct output values represented by the training data. The training module 212 performs backpropagation from the calculated errors of the output values, thereby calculating the weights of couplings between each neuron and respective errors with the thresholds of each neuron. The training module 212 then updates the weights of the couplings between each neuron and the thresholds of each neuron based on the calculated errors.

The training module 212 repeats the above process until the output values from the object detection model 111 match the output values represented by the training data for the plurality of images. Consequently, the parameters of the object detection model 111 can be optimized and the object detection model 111 can be trained.

The initial values of each type of parameter of the object detection model 111 may be applied with a template. Alternatively, the initial values of the parameters may be applied manually through human input. When retraining of the classification model 111 is performed, the training module 212 may prepare the initial values of the parameters based on the trained parameters D23 of the classification model 111 that serves as the object of the retraining.

The training system 200 may update the trained parameters D23 by regularly executing the abovementioned training of the object detection model 111. The training system 200 may transfer the updated trained parameters D23 to the controller 27. The controller 27 may update the parameters of the object detection model 111 with the transferred trained parameters D23.

Although an embodiment of the present invention has been described so far, the present invention is not limited to the above embodiment and various modifications may be made within the scope of the invention.

The work machine 1 is not limited to a hydraulic excavator and may be another vehicle such as a wheel loader or a motor grader or the like. The configuration of the work machine 1 is not limited to the above embodiment and may be modified. The work machine 1 may be driven by an electric motor. For example, the undercarriage 14 and/or the rotating body 13 may be driven by an electric motor. The configuration of the work implement 12 may be modified. For example, the work implement 12 is not limited to the bucket 19 and may include another attachment for loading such as a grapple, a fork, a lifting magnet, or the like.

The conveyance vehicle 2 may be a vehicle other than a dump truck. The configuration of the conveyance vehicle 2 is not limited to the configuration of the above embodiment and may be modified. The conveyance vehicle 2 may not be operated under automatic control. Alternatively, the conveyance vehicle 2 may be driven manually by an operator. The conveyance vehicle may be omitted. That is, the work performed by the work machine 1 may be work other than work in cooperation with the conveyance vehicle 2.

The configurations of the sensors mounted on the work machine 1 are not limited to the configurations of the above embodiment and may be modified. For example, the topography sensor 35 may be disposed in a portion other than the side part of the rotating body 13. The topography sensor 35 is not limited to a LIDAR device and may be another sensing device such as a radar device or the like. Alternatively, the topography sensor 35 may be a camera and the topography may be recognized by the controller 27 analyzing images captured by the camera.

The work monitoring camera 36 may be disposed in a portion other than the front part of the rotating body 13. The periphery monitoring cameras 41 to 44 may be disposed in portions other than both side parts and the rear part of the rotating body 13.

The controller 27 is not limited to one unit and may be divided into a plurality of controllers 27. The processing executed by the controller 27 may be distributed and executed among the plurality of controllers 27. In such a case, a portion of the plurality of controllers 27 may be disposed outside of the work machine 1.

The processing under the automatic control mode executed by the controller 27 is not limited to the above embodiment and may be modified. The predetermined work performed by the work machine 1 in the first control mode is not limited to excavation and loading and may be other work. The controller 27 may stop the work machine 1 in the second control mode. Alternatively, the controller 27 may limit the actions of the work machine 1 in the second control mode more than the actions in the first control mode. For example, the controller 27 may reduce the rotating speed of the work machine 1. The controller 27 may reduce the rotating range of the work machine 1. The controller 27 may reduce the traveling speed of the work machine 1. The controller 27 may reduce the traveling range of the work machine 1.

As indicated above, the controller 27 determines the distance parameter D for each predetermined sampling time period. When a differential between the current distance parameter D and the previous distance parameter D is greater than a predetermined threshold, the controller 27 may correct the current distance parameter D so as to minimize the differential. For example, the controller 27 may determine an average value between the current distance parameter D and the previous distance parameter D as the current distance parameter D. Alternatively, the controller 27 may ignore the current distance parameter D and set a value that is the same as the previous distance parameter D as the current distance parameter D.

Figure 12:
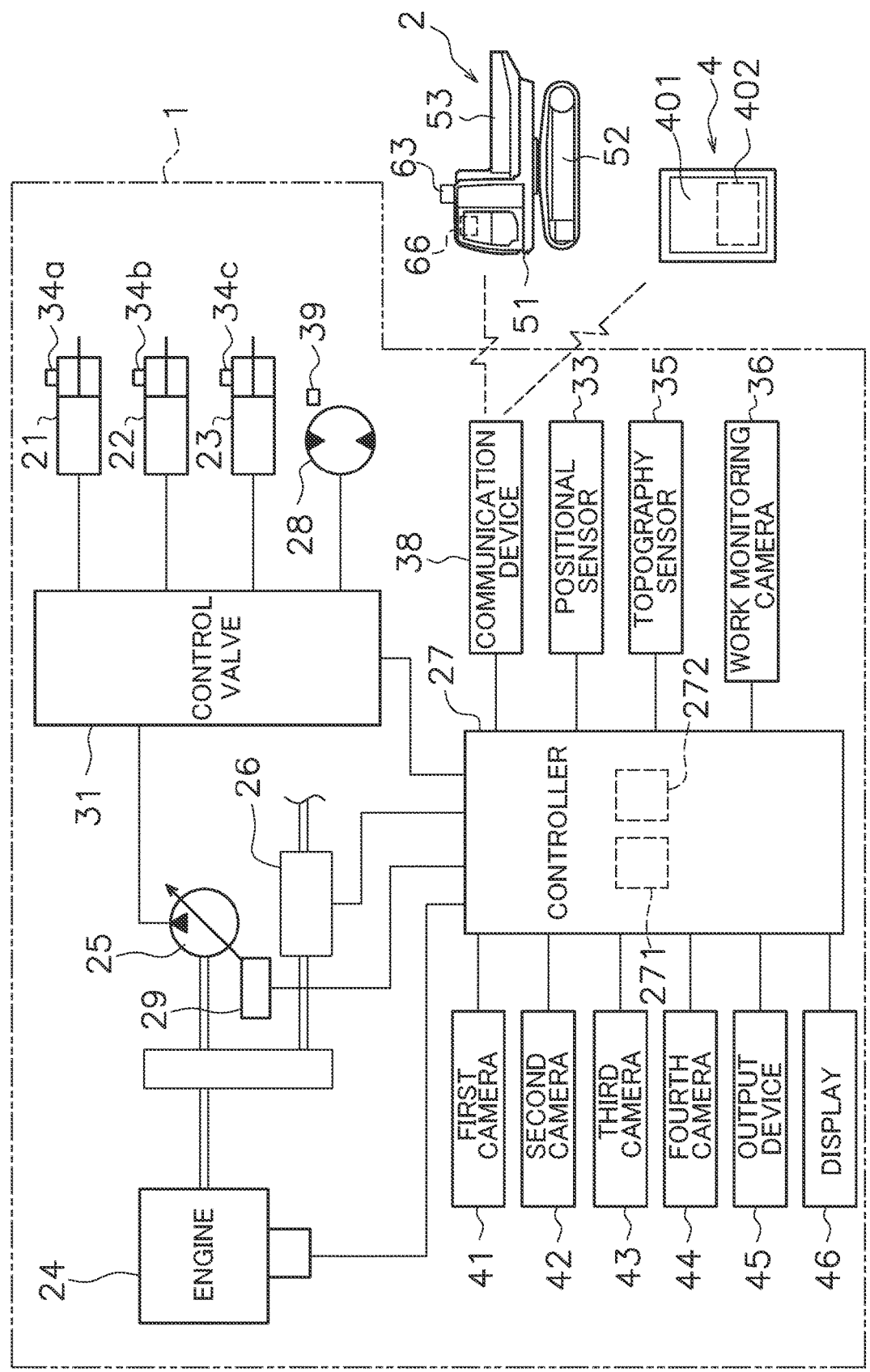
FIG. 12 is a block diagram of a configuration of the work machine according to a modified example.

FIG. 12 is a block diagram illustrating a configuration of a control system of the work machine 1 according to a modified example. As illustrated in FIG. 12, the control system of the work machine 1 may include a display 46. The display 46 is, for example, a liquid crystal display (LCD), an organic electroluminescence (EL) display, or a cathode ray tube (CRT) display or the like. The controller 27 may add the class and the distance of the specific object detected from the captured image to the captured image and display the captured image on the display 46. The display 46 may be mounted in the work machine 1. Alternatively, the display 46 may be disposed outside of the work machine 1.

According to the present invention, it is possible to perform a work by a work machine automatically while taking into account the peripheral environment.

The invention claimed is:

1. A system comprising:
   a work machine;
   a camera configured to capture an image including a periphery of the work machine; and
   a processor configured to
      acquire image data indicative of a captured image captured by the camera,
      acquire, from the image data, at least one specific object present in the captured image and a distance from the work machine to the at least one specific object by performing image analysis using an object detection model trained using an image of the at least one specific object and the distance to the at least one specific object,
      determine whether the at least one specific object is one specific object or a plurality of specific objects,
      upon determining that the at least one specific object is one specific object, set the distance from the work machine to the one specific object as a distance parameter and control the work machine based on the distance parameter, and
      upon determining that the at least one specific object is a plurality of specific objects, select a shortest distance among distances from the work machine to each of the plurality of specific objects as the distance parameter and control the work machine based on the distance parameter.

2. The system according to claim 1, wherein
   the processor is further configured to
      when the distance parameter is equal to or greater than a predetermined distance threshold, control the work machine in a first control mode in
      which the work machine performs a predetermined work automatically, and
      when the distance parameter is less than the predetermined distance threshold, control the work machine in a second control mode that is different from the first control mode.

3. The system according to claim 2, wherein
   the processor is further configured to
      acquire a plurality of sets of image data which represent a plurality of captured images of the work machine in different directions and,
      when the specific object is detected in each of the plurality of captured images by image analysis using the object detection model, determine the distance parameter for each of the plurality of captured images and,
      when at least one distance parameter among the distance parameters of each of the plurality of captured images is less than the predetermined distance threshold, control the work machine in the second control mode.

4. The system according to claim 2, wherein
   the work machine includes an output device, and
   the processor is further configured to cause the output device to output a warning in the second control mode.

5. The system according to claim 2, wherein
   the processor is further configured to limit actions of the work machine in the second control mode more than in the first control mode.

6. The system according to claim 2, wherein
   the processor is further configured to stop the work machine in the second control mode.

7. A system comprising:
   a work machine;
   a camera configured to capture an image including a periphery of the work machine; and
   a processor configured to
      acquire image data indicative of a captured image captured by the camera,
      acquire, from the image data, a specific object present in the captured image and a distance from the work machine to the specific object by performing image analysis using an object detection model trained using an image of the specific object and the distance to the specific object, control the work machine based on the distance from the work machine to the specific object when the specific object is detected in the captured image, acquire the distance for each of a plurality of predetermined time periods, the plurality of time periods including a current time period and a previous time period occurring before the current time period, and when a differential between the distance in the current time period and the distance in the previous time period is greater than a predetermined threshold, correct the distance in the current time period so as to reduce the differential.

8. The system according to claim 1, wherein the camera is a single lens camera.

9. The system according to claim 1, wherein the specific object includes a person.

10. A method executed by a processor for controlling a work machine, the method comprising:

acquiring image data indicative of a captured image including a periphery of the work machine;

acquiring, from the image data, at least one specific object present in the captured image and a distance from the work machine to the at least one specific object by performing image analysis using an object detection model trained using an image of the at least one specific object and the distance to the at least one specific object;

determining whether the at least one specific object is one specific object or a plurality of specific objects, upon determining that the at least one specific object is one specific object, setting the distance from the work machine to the one specific object as a distance parameter and controlling the work machine based on; and upon determining that the at least one specific object is a plurality of specific objects, selecting a shortest distance among distances from the work machine to the plurality of specific objects as the distance parameter and controlling the work machine based on the distance parameter.

11. The method according to claim 10, further comprising:

when the distance parameter is equal to or greater than a predetermined distance threshold, controlling the work machine in a first control mode in which the work machine performs a predetermined work automatically; and when the distance parameter is less than the predetermined distance threshold, controlling the work machine in a second control mode that is different from the first control mode.

12. The method according to claim 11, further comprising:

acquiring a plurality of sets of image data representing a plurality of captured images of the work machine in different directions;

when the specific object is detected in each of the plurality of captured images by image analysis using the object detection model, determining the distance parameter for each of the plurality of captured images; and when at least one distance parameter among the distance parameters of each of the plurality of captured images is less than the predetermined distance threshold, controlling the work machine in the second control mode.

13. The method according to claim 11, wherein the work machine includes an output device, and the controlling the work machine in the second control mode includes causing the output device to output a warning.

14. The method according to claim 11, wherein the controlling the work machine in the second control mode includes limiting actions of the work machine more than in the first control mode.

15. The method according to claim 11, wherein the controlling the work machine in the second control mode includes stopping the work machine.

16. The method according to claim 10, wherein the specific object includes a person.

* * * * *